US005675753A

United States Patent [19]
Hansen et al.

[11] Patent Number: 5,675,753
[45] Date of Patent: Oct. 7, 1997

[54] METHOD AND SYSTEM FOR PRESENTING AN ELECTRONIC USER-INTERFACE SPECIFICATION

[75] Inventors: Benjamin E. Hansen, Westminster; Mark Greenelsh, Aurora, both of Colo.

[73] Assignee: U.S. West Technologies, Inc., Boulder, Colo.

[21] Appl. No.: 427,536

[22] Filed: Apr. 24, 1995

[51] Int. Cl.$^6$ .................. G06F 15/00; G06F 7/00
[52] U.S. Cl. .................. 395/333; 395/331; 395/335; 395/340; 395/613; 395/614; 395/615
[58] Field of Search .................. 395/329, 330, 395/331, 332, 333, 335, 339, 340, 346, 613, 614, 615

[56] References Cited

U.S. PATENT DOCUMENTS

| | | | |
|---|---|---|---|
| 5,539,869 | 7/1996 | Spoto et al. | 395/154 |
| 5,550,968 | 8/1996 | Miller et al. | 395/157 |

Primary Examiner—Kee M. Tung
Assistant Examiner—Huynh Ba
Attorney, Agent, or Firm—Brooks & Kushman, P.C.

[57] ABSTRACT

A method is disclosed for preparing an interactive user-interface specification. The method is for use with a computer system including a processor, a memory, a display device and an input device. The method begins with the step of providing a data structure representing a control tree. The control tree represents the interface screens, screen objects and link-associations of the interface. The method further includes the step of presenting a representation of an element of the control tree based on the data structure. A system is also disclosed for implementing the steps of the method.

29 Claims, 13 Drawing Sheets

New User Information

First Name: ▶

Last Name: ▶

Discipline: ▶ End User

[ OK ]

[ Cancel ]

METHOD AND SYSTEM FOR PRESENTING AN ELECTRONIC USER-INTERFACE SPECIFICATION

TECHNICAL FIELD

This invention relates to methods and systems for preparing an electronic user-interface specification for use in the development of a multimedia application.

BACKGROUND ART

As an early step in the development of a multimedia application, an application development team often prepares a specification describing the functionality of the application. In particular, the specification often describes the desired user-interface and flow of the multimedia application to be developed.

Prior art methods and systems produce a paper-based specification which includes a detailed textual description of the user-interface and a set of illustrative figures. Under the prior art, the paper-based specification is generated using a standard word processor such as Microsoft Word and a standard drawing program such as Adobe Illustrator.

Typically, the specification serves as the primary design document for the multimedia application and is distributed to the members of the development team. The development team may include human factors engineers, creative directors, graphic artists, multimedia technicians, development engineers and coders.

Each member of the development team uses a portion of the information contained in the specification to perform his/her job. Due to its comprehensive nature, therefore, the specification contains a considerable amount of information and is often voluminous.

Although the information contained in a user-interface specification is necessary to develop multimedia applications, prior art methods and systems for generating such specifications have a number of deficiencies. First, because each team member only uses a fraction of the information contained in the specification, some team members are inclined to read only a portion of the specification. Such selective reading often results in a team member missing vital information required to correctly perform his/her assigned tasks.

Second, because a static paper-based specification is being used to convey the functionality of a dynamic multimedia application, the user-interface is often difficult to visualize. Some team members might interpret the description of the user-interface differently from other team members causing delays in the development process.

Finally, even if the specification is thorough and concise, and each team member reads the entire specification, the comprehensive nature of the document is likely to confuse at least one team member. Team members will likely be confused by extraneous information which is beyond the scope of both their understanding and responsibilities. Further, the specification simply contains more information than any one team member can assimilate.

Consequently, a need exists for an improved method and system for generating a user-interface specification for developing multimedia applications.

DISCLOSE OF THE INVENTION

It is an object of the present invention to provide a method and system for generating a visual, interactive electronic user-interface specification which can be accessed and utilized by a diverse target audience.

It is another object of the present invention to provide a method and system for generating an electronic user-interface specification which can be tailored to the type of audience accessing the specification.

It is yet another object of the present invention to provide a method and system for generating an electronic user-interface specification which reduces the time required for developing multimedia applications.

In carrying out the above objects and other objects of the present invention, a method is provided for preparing an interactive user interface specification. The method is for use with a general purpose digital computer system including a processor, a memory, a display device and an input device. The method includes the step of providing a data structure representing a control tree. The control tree represents the flow of a user interface to a multimedia application.

The data for the control tree defines the interface screens, the objects displayed on the screens and link associations. The link associations connect pairs of the interface screens and represent transitions between interface screens.

The method also includes the step of presenting a representation of an element of the control tree based on the data structure. Preferably, the element is a screen icon, a link association icon or a screen object.

In further carrying out the above objects and other objects of the present invention, a system is also provided for carrying out the steps of the above described method.

These and other objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein:

FIG. 12 is a user information dialog box; and

BEST MODES FOR CARRYING OUT THE INVENTION

The method and system of the present invention have been implemented using a general purpose computer programmed to support the preparation of an interactive user interface specification. In the preferred embodiment, a software application known as the "Multimedia Interactive Specification Tool" ("MIST") was developed by Applicants to aid in the dissemination of information concerning user interface specifications for interactive multimedia products.

As disclosed herein, MIST utilizes a graphical user interface ("GUI") to accommodate more visually inclined persons involved in the development of an interface such as creative directors, graphic artists and clients. MIST also fosters accurate communication and understanding between diverse groups of development personnel such as artists and coders.

Hardware Environment

Figure 1:
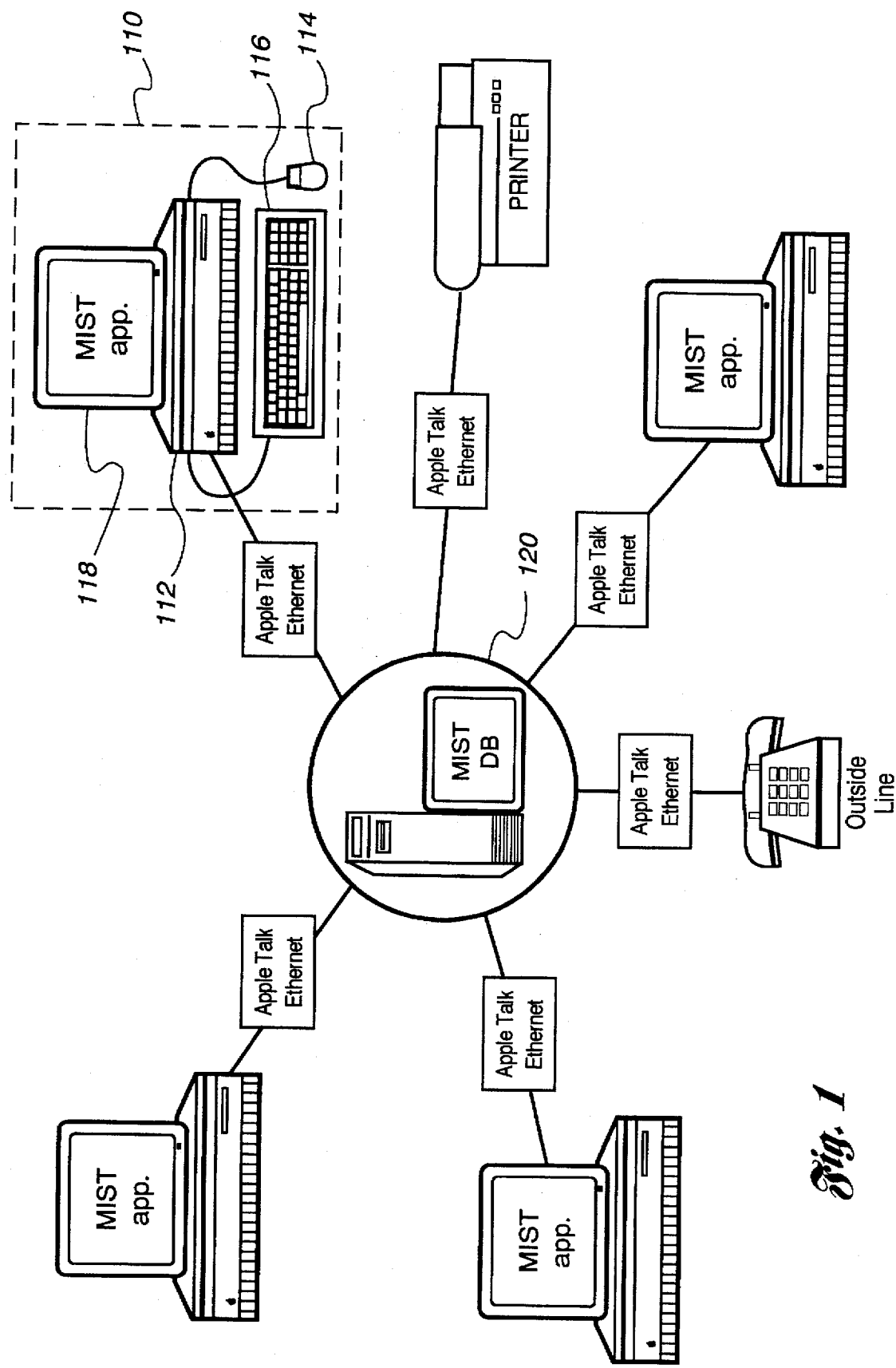
FIG. 1 is a block diagram of a preferred hardware environment in which the present invention may be implemented.

Referring now to the drawings, FIG. 1 illustrates the preferred hardware environment of the present invention. The hardware includes a Macintosh workstation 110 having a chassis 112, a mouse 114, a keyboard 116 and a monitor 118. Although the preferred embodiment is Macintosh-based, implementation of the present invention is not limited to any specific operating environment.

Chassis 112 includes a Motorola 68030 or higher processor. The software of the present invention will operate on any Macintosh series computer running system 7.0 or later. Macintosh Quadra class workstations are preferred as they are generally available to software developers and prototypers. The application of the present invention will run on less equipped Macintosh models, but performance may suffer if large image files must be processed or high network demands are necessary.

Chassis 112 further includes a mass storage unit. The required capacity and performance characteristics of the mass storage unit is dependent on the size of the interface being laid out within MIST.

A final interface under design, for example, may consist of no more than a few MB of asset data after using compression and other techniques to reduce file size. However, the development of the final assets to be used by the release software will require processing uncompressed source art and several iterations of transforming the assets into final form.

Generally, it is recommended that not less than 500 MB of mass storage be fitted to the hardware environment where the asset data is to be stored. Ultimately, the minimum performance characteristics of the mass storage unit are dictated by the performance requirements necessary to display the most data intensive media asset. For example, a simple box with text is less data intensive than full motion video.

In addition to a Motorola 68030 processor and a mass storage unit, chassis 112 preferably includes a floating point processor. No accelerators are required, but a QuickDraw™ accelerator is recommended for working in 24 bit pixel depth. In addition, the most recent version of QuickTime™ is recommended as this will increase the performance of any QuickTime™ assets incorporated into the interface design. Support for Ethernet network connectivity is recommended for network use.

Monitor 118 should be at least a standard 8-bit color Macintosh monitor for displaying the elements of the GUI. Preferably, a color monitor that supports 24-bit color should be used if MIST must display high-resolution source art images. Optionally, since many multimedia applications are directed to a television user community, NTSC, or PAL output will be useful if interface preview functions are implemented.

In addition to mouse 114 and keyboard 116, an array of input devices could be incorporated with the present invention, including scanners or digitizers for slides, static art, video, audio (from several source types), etc. Art creation peripherals may also be utilized, such as art tablets or other alternative input media. These peripherals however, support the acquisition and creation of multimedia assets and are not directly related to the MIST application.

Although MIST has been designed to operate on a standalone Macintosh, the preferred environment of the present invention includes a network server 120. Use of network server 120 provides remote access to network resources and allows the incorporation of files created on separate systems. Such files may include comments entered into a standalone Apple Powerbook or assets residing on a remote machine.

In order to support a network of Macintosh computers, Apple talk or other network software is required. Ethernet is recommended if files will be stored on one or more remote servers 122. Server 122 may be used in applications requiring large size image, animation and audio files. Bandwidth, response times and delays will not affect MIST directly, but might frustrate the user if occurring in excess.

The network based implementation must support:

Simultaneous multi-user access to server-located MIST files.

Database management of MIST specification files, user comments and change requests.

User identification for edit privileges, change management control and security.

File copy and check-out management for remote use, such as for communication, evaluation and demonstration on stand-alone systems such as Apple Powerbooks or systems in remote cities.

Incorporation of user comments from remote sources, such as entry via an Apple Powerbook.

Software Environment

Figure 2:
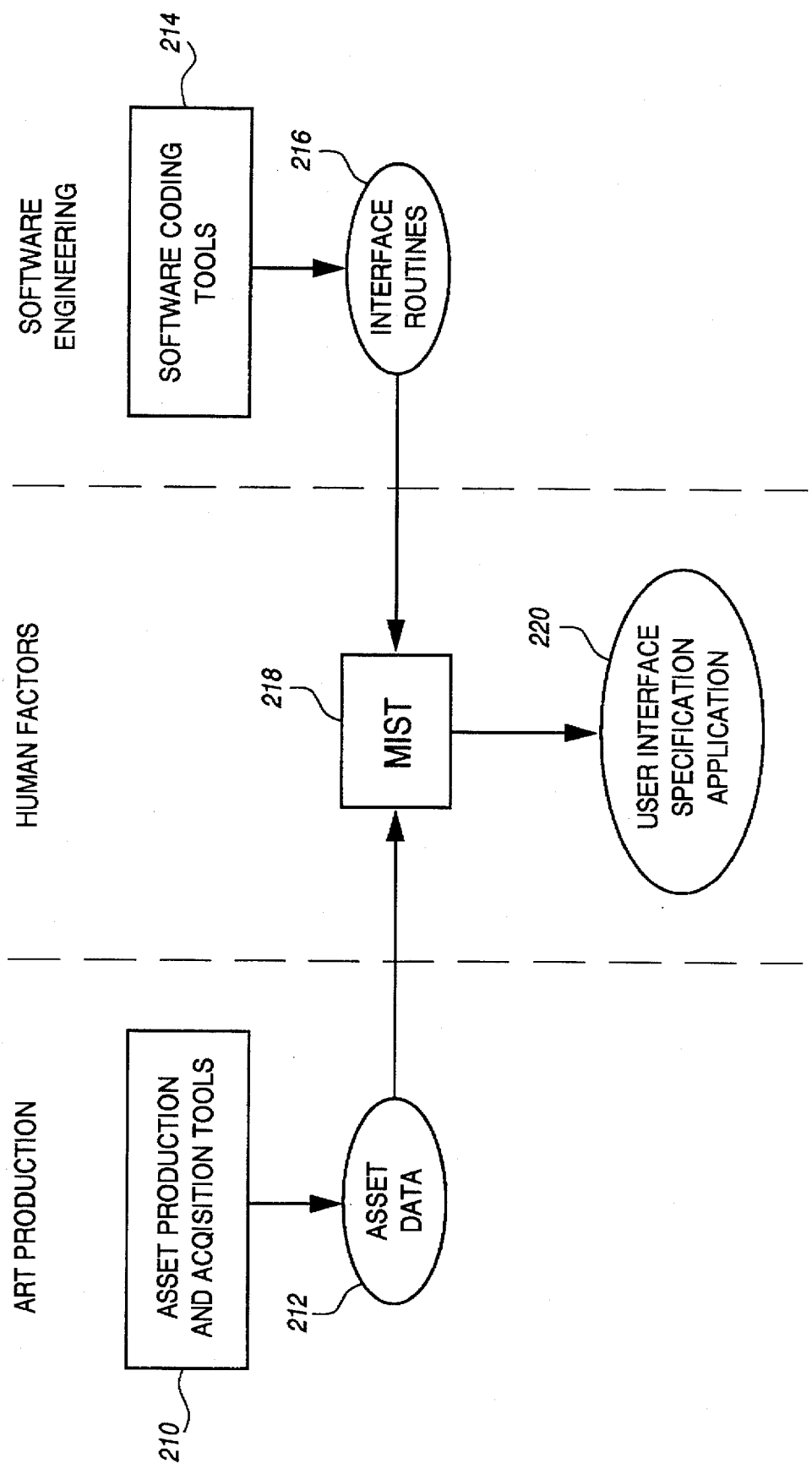
FIG. 2 is a functional block diagram illustrating the software components of a preferred embodiment.

Referring now to FIG. 2, the software components of the preferred embodiment are illustrated using a functional block diagram. Art production is accomplished using standard asset production and acquisition tools 210. The use of such tools results in digitized compressed asset data 212.

Software engineering of specialized interface routines is accomplished through the use of standard software coding tools 214. The use of such tools results in a library of interface routines 216.

Human factors personnel utilize the mist application 218 to produce an interactive user interface specification 220. Mist 218 uses asset data 212 and interface routines 216 to create the specification 220.

MIST Menu Bar

Figure 3:
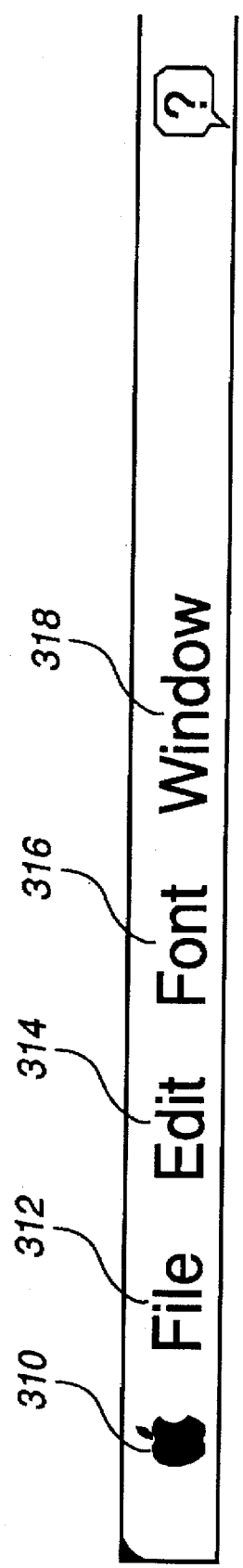
FIG. 3 is a menu bar of a preferred embodiment.

Referring now to FIG. 3, the Mist Menu bar includes five pull-down menus as shown.

Apple Menu

Apple Menu 310 includes all entries in accordance with the standard Macintosh system implementation. Apple Menu 310 also includes "About Mist" and "Info . . . " Table 1 describes the items of Apple Menu 310.

TABLE 1

| ITEM | DESCRIPTION |
|---|---|
| "About MIST" | Brings up a window that describes the purpose of MIST, listing credits for application engineering and ownership, and provides information about who to contact for further information. |
| "Info . . ." | Brings up a window detailing information about the currently active MIST application file. The window includes information such as the creator of the |

TABLE 1-continued

| ITEM | DESCRIPTION |
|------|-------------|
|      | document, the date and time of its creation and latest modification, the total amount of memory the file utilizes, and the people currently working on the document. |

File Menu

File Menu 312 includes ten items: new, open, close, save, save as . . . , revert, preferences, page setup, print, and quit. Table 2 describes the items of File Menu 312.

TABLE 2

| ITEM | DESCRIPTION |
|------|-------------|
| New | Creates a new MIST file |
| Open | Opens an existing MIST file |
| Close | Closes the current MIST file. Standard Macintosh procedures are used for saving conventions. |
| Save | Saves a file in its current state. If the file is open it remains open. If the user has requested that the file be closed, the file is saved and then closed. |
| Save As | Acts as the save command, naming the file with a new name. |
| Revert | Re-opens the file to its last saved state without saving any current changes made by the current user. |
| Preferences | Sets the preferences for MIST and the current MIST file, such as the ability to lock or unlock descriptions. |
| Page Setup | Calls the standard Macintosh page set-up dialog allowing the user to set up the parameters for printing. |
| Print | Prints a hard copy of the specification. |
| Quit | Closes the current MIST file and closes the application. |

Edit Menu

Edit Menu 314 includes eight items described in Table 3.

TABLE 3

| ITEM | DESCRIPTION |
|------|-------------|
| Undo | Returns the file to its state prior to the last action. |
| Cut | Copies the currently selected asset or region, including all of the region's contents, to the clipboard and removes it from the work area. |
| Copy | Copies the. currently selected an asset or a region including all of its contents to the clipboard. |
| Paste | Pastes the contents of the clipboard into the currently selected screen window, background or region as appropriate. |
| New (Screen, Object) | Creates a new screen icon if the Control Tree is the active window. Creates a new object on a screen if a screen-related window (the screen or any of its descriptions) is the active window. The new screen/object is centered in the Control Tree or Screen window, highlighted. Further, a dialog box appears, requiring the user to enter information about the new screen or object. |
| (Screen, Object) Info. | Brings up a dialog box allowing the user |

TABLE 3-continued

| ITEM | DESCRIPTION |
|------|-------------|
|      | to edit the parameters of a screen or object, such as its name, ID number or link associations. It also allows the user to lock the screen/object so that no changes can be made. |
| Screen Size | Brings up a dialog box allowing the user to set the screen size for the interface. This is a global setting. The sizes are shown in pixels. Changing the screen size of existing screens does not affect the locations of any object on the screen with respect to the upper left corner of the screen. |
| Set Link/Transition | Brings up a dialog box allowing the user to set or change the link association assigned to an object |

Font Menu

Font Menu 316 includes three items described in Table 4.

TABLE 4

| ITEM | DESCRIPTION |
|------|-------------|
| Font | Displays a sub menu of the fonts available on the current system. |
| Size | Displays a sub menu of the font sizes. |
| Style | Displays a sub menu of the font styles. |

Window Menu

Window Menu 318 includes nine items described in Table 5.

TABLE 5

| ITEMS | DESCRIPTION |
|-------|-------------|
| New Screen | Creates a new screen window for the currently active file. A dialog box appears requiring the user to set parameters of the new screen, such as the screen's name and control flows. The Control Tree window is made the active window when a new screen is requested, and a highlighted icon depicting the new screen appears in the center of the screen. |
| General Information | Toggles the visibility of the General Information window and makes it the active window when toggling on. |
| Control Tree | Toggles the visibility of the Control Tree window and makes it the active window when toggling on. |
| Screens > | Displays a sub-menu of all the screen windows associated with the currently active file. Selecting a sub-menu item makes that screen the currently active screen. |
| Tools > | Displays the tool palette. |
| Description | Toggles the visibility of the description window and makes it the active window when toggling on. |
| User Comments | Toggles the visibility of the comments for the current window and makes it the active window |

TABLE 5-continued

| ITEMS | DESCRIPTION |
| --- | --- |
| | when toggling on. |
| Input Comments | Toggles the visibility of the comments for the current window and makes it the active window when toggling on. |
| Remote > | Displays a sub-menu of all window available defining remote control units. Includes a sub-menu item to create a new Remote Control window. |

MIST Control Tree Window

Figure 4:
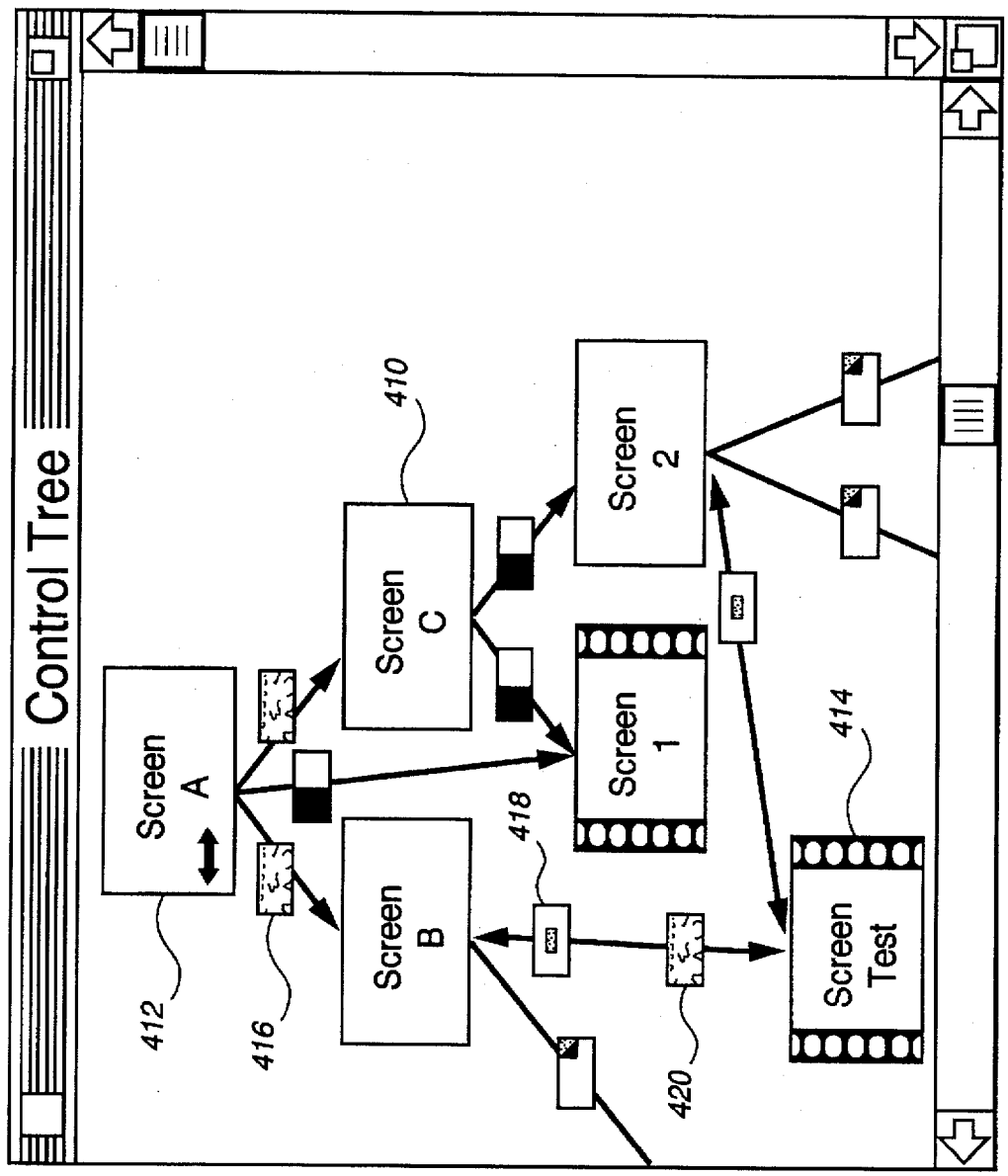
FIG. 4 is a control tree window.

Referring now to FIG. 4, there is shown the MIST Control Tree window. The MIST Control Tree window is a movable, resizable window containing a tree-like structure representing not only the screens and screen objects within the application being specified but also the flow of control between the screens.

The MIST Control Tree window includes a screen icon for each separate screen in the interface. Each screen icon may be graphically suggestive of the type of screen it represents. For example, screen 410 is static and is represented by a plain box. Screen 412 is navigable and is represented by a box including a multi-way arrow. Screen 414 is a movie and is represented by a box including film sprockets.

Single clicking on a screen icon in the MIST Control Tree window highlights the icon. The screen icon appears in reverse text when highlighted. The user can request the dialog box associated with the highlighted screen icon via the "Screen Info" item under the "Edit" menu or by pressing [Apple]-I when the Control Tree window is the active window and a screen icon is highlighted. The data within the dialog box can be edited throughout the life of the screen.

Screen Dialog Box

Figure 5:
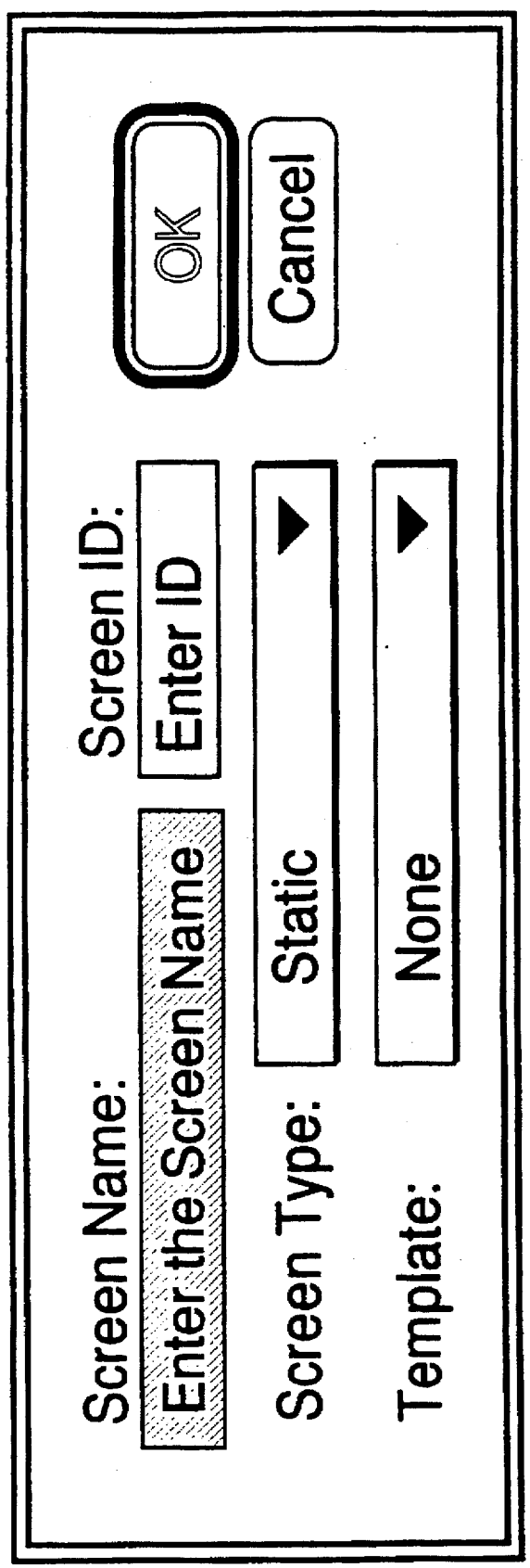
FIG. 5 is a screen name dialog box.

A new screen icon is added to the Control Tree when the user selects the "New Screen" item under the "Edit" menu or presses the [Apple]-N key while the Control Tree window is the active window. When a new screen icon is created, the user is presented with the modal dialog box shown in FIG. 5. The user is then required to define the name, ID and type of the screen being created. The user must identify the new screen with a name and ID. The "OK" button in the dialog will not become active until the user does so.

The type of screen is set via a pop-up menu which defaults to "Static." The user also has the option of selecting a template for the new screen, if one exists. When the dialog box is dismissed, the new screen icon appears, highlighted in center of the Control Tree window.

The screen icons of the Control Tree window are joined by a set of link associations showing the relationship of the flow of control through the interface. These associations have arrows representing the type of relationship the screens have to each other, that is, the flow of control through the interface.

Figure 6:
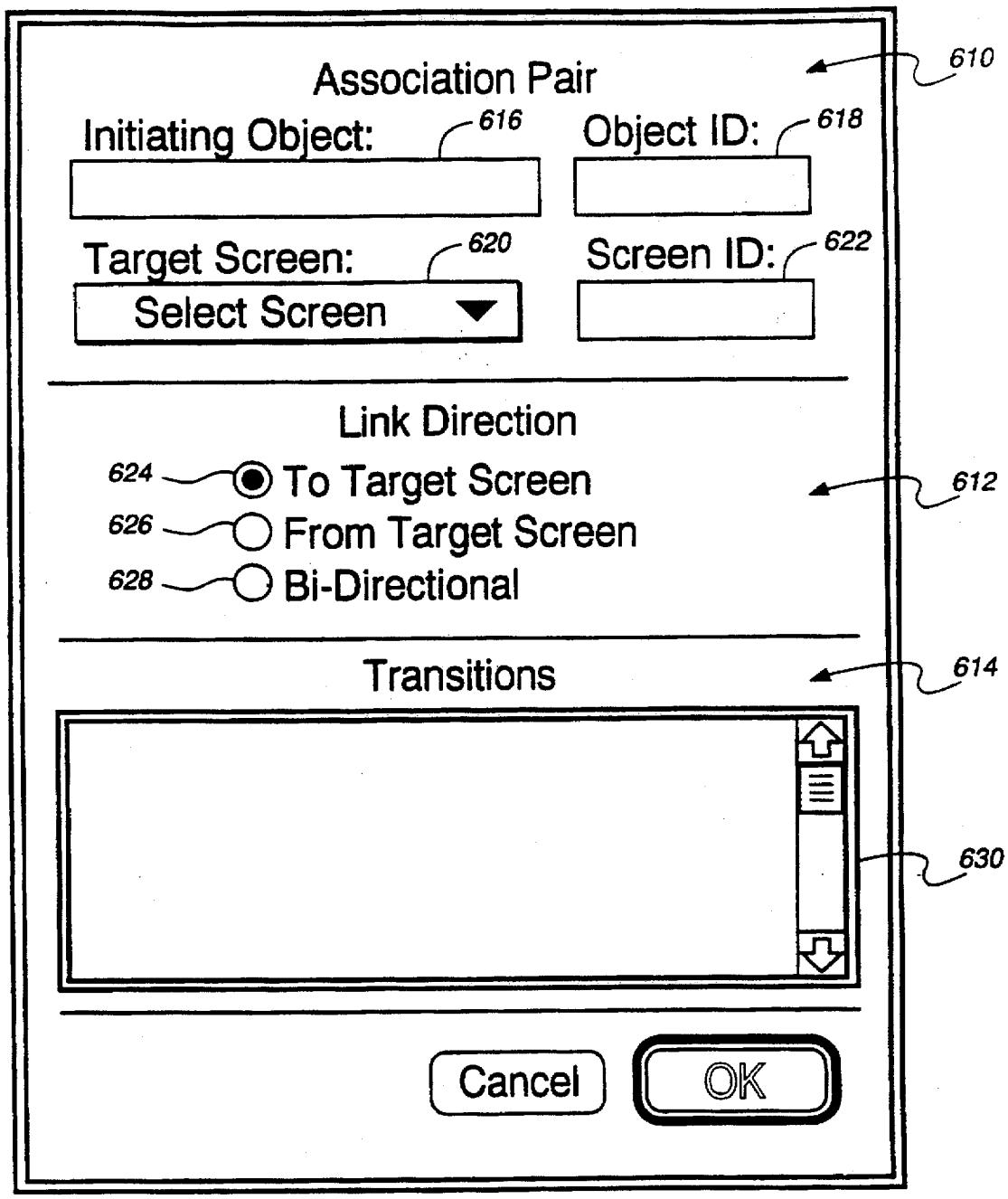
FIG. 6 is a link association dialog box.

A link association is defined via the Link Association dialog box shown in FIG. 6. The Link Association dialog box can be summoned by the user in a number of ways:

Highlighting two screen icons by shift clicking on them and then selecting the "Association Info" item under the "Edit" menu or by pressing the [Apple]-I key while 2 screen icons are highlighted. Note that a maximum of 2 screen icons can be highlighted at any time.

Double-clicking on an existing association link.

Creating a new screen object in a screen window. This will bring up the dialog box associated with the object, including the data associated with the association link.

Edit an existing screen object.

Each association should be annotated with an icon or name of the transition to be used between the two screens. Link association icons represent the link between two screens of the user interface. To maintain an uncluttered control tree representation, some links, such as links between an object and a screen, may not have a visible link association icon.

Link association icons appear as arrows and may include a transition icon, such as transition icon 416, which appears along the association link. If the link is bi-directional, then two icons, such as transition icons 418 and 420, will appear along the link. Each transition icon is positioned along the association link near the arrow of its intended transition direction.

A highlighted screen icon can be positioned anywhere in the Control Tree window by dragging it to the desired location. As the icon is dragged, any links and associated transitions are dragged with the icon.

Double clicking on a screen icon will bring up the screen window represented by the icon to design or edit the screen making the screen window the active window. A highlighted screen icon, and its associated screen can be deleted by selecting the "Delete Screen" item under the "Edit" menu or pressing the [Apple]-d key while a screen object is highlighted.

Progress of the design of each screen is illustrated in the tree by a scheme of color coding to aid in project management. Completed screen designs appear in green, those in-progress appear in yellow, and those screens not yet defined appear in red.

The Control Tree window can hold multiple trees, including trees containing only a single screen. The contents of the Control Tree window can be output to a printer or printable file. The output includes a graphic representation of the Control Tree and a table summarizing the associations and management assignments and progress through the tree.

This structure allows MIST to be a tool that can be utilized for the user interface specification, the development and placement of multimedia assets throughout the interface and for certain aspects of high level management of the production and development effort.

Link Association Dialog Box

Referring now to FIG. 6, the Link Association dialog box includes three areas: the association pair section 610, the link direction section 612, and the transition section 614. If the association is bi-directional then a transition selection is displayed for each direction. In the case of a bi-directional transition, two scrolling list boxes are stacked, each titled with the name of the target screen, e.g. "Transition to 'MAP'."

Association Pair section 610 allows the association pair to be assigned for the link. An initiating object must be identified at fields 616 and 618, and a target screen must be identified at fields 620 and 622.

If the screen is a new screen or has not yet had any objects defined for it, then fields 616 and 618 are uneditable by the user. To indicate this, "No Objects Defined" is displayed at field 616. If the current active window is associated with a screen window, then the name and ID of the currently active object are displayed at fields 616 and 618.

If the current active window is the Control Tree window, or the active object on an active screen window is the background, then the user is presented with a pop-up list of all the objects on the currently highlighted screen. This pop-up list is presented at field 616 and allows the user to select the desired object.

A pop-up list presented at field 620 allows the user to select the destination of the link. The pop-up list provides a list of all existing screens currently specified for the application interface. If no screens exist, "No Screens Defined" is displayed at field 620 in place of the pop-up list.

The Object ID 618 and Screen ID 622 are automatically defined based on fields 616 and 620, respectively.

The Link Direction section 612 consists of a set of radio buttons 624–628. The user selects one radio button to define the direction of the link. Link directions include: to a target screen; from a target screen; and both directions. The default setting is radio button 624 "To Target Screen."

The Transition section 614 allows the user to select the transition effect desired during the transition. All available transitions are listed in scrolling list box 630. The default transition is "Dissolve." List box 630 is divided into three columns: the left column displays a graphic depicting the transition type; the center column contains the name of the transition; and the right column contains a textual description of the transition effect. Clicking a row sets the transition to be used between the association pair.

If the link is bi-directional, two stacked transition list boxes are provided. Each list box is identified to indicate the direction to which the transition will apply.

If the link association for the pair has previously been defined when the dialog box is requested, the existing definition is displayed when the dialog first appears to the user. The "OK" button is inactive until the association pair has been defined.

Screen Windows

Figure 7:
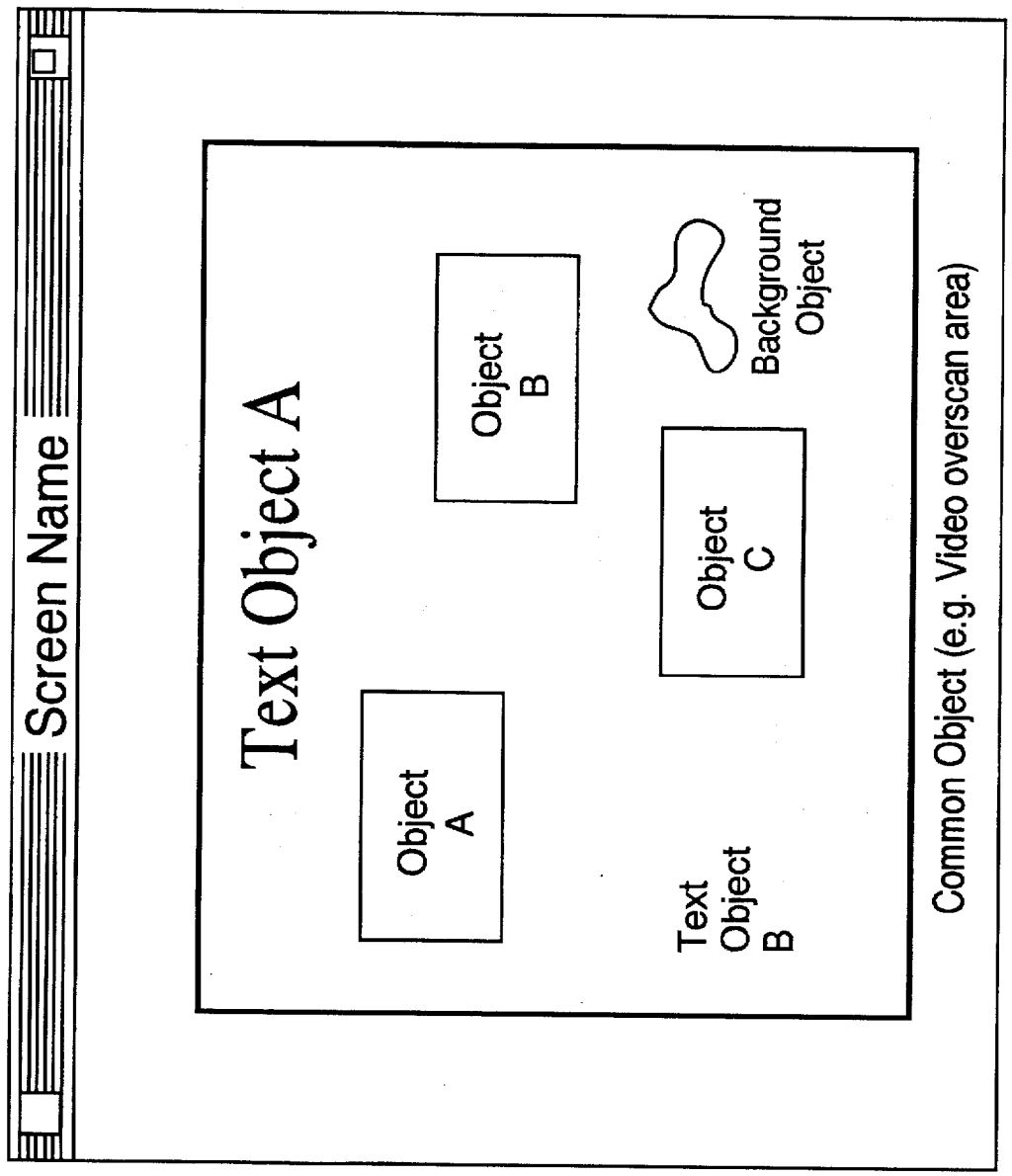
FIG. 7 is a screen window.

For each screen of the interface being designed, a separate Screen window is created. The Screen window, shown in FIG. 7, is movable and resizable. Description and Comment windows are associated with each Screen window. Screen sizes may be specified by the user by selecting the "Screen Size" item of the "Edit" menu. Screen size is specified using a "Screen Size" dialog box. The default size can be set in the "Preferences" dialog box also available under the "Edit" menu.

The Screen window holds a graphic representation of a screen. The Screen window may contain one or more objects. Each object represents one or more media assets. A media asset can be a digitized picture, a movie or similar element. Descriptions about the objects within a window are available using the Screen and Object Description window.

Each screen must be of a selected screen type. Table 6 includes illustrative screen types.

TABLE 6

| SCREEN TYPE | DESCRIPTION |
| --- | --- |
| Static | A stationary screen, containing a number of stationary objects which serve chiefly as buttons for navigation. |
| Navigable | A screen that can be "panned" in an ordinal way to access objects within a "scene" which act as buttons. |
| Movie | A linear series of ordinal frames that may have an automatic exit association assigned to it. |
| Template | A screen holding objects that appear on multiple screens. |

Objects

Each Screen window can contain a number of objects. An object can be, among other things, a graphic, a block of text, an animation, or a movie. Objects are not limited to a media type, but can have interactive behaviors associated with them such as window primitives. An object can be highlighted by single clicking on it. A highlighted object can be moved to a new position on the screen by dragging the object to the desired position. An object has a unique description, shown in the Description window. The object may have multiple states. Table 7 includes illustrative object states.

TABLE 7

| OBJECT STATE | DESCRIPTION |
| --- | --- |
| Static | An unchanging object. |
| Highlighted | The current object of focus on the screen. |
| Active | Engaged in activity, usually for the purpose of drawing the user into the interface, such as a compelling animation or movie clip. |
| Set | Depicting a state for the purpose of the application, such as a check mark on a desired option. |

Figure 8:
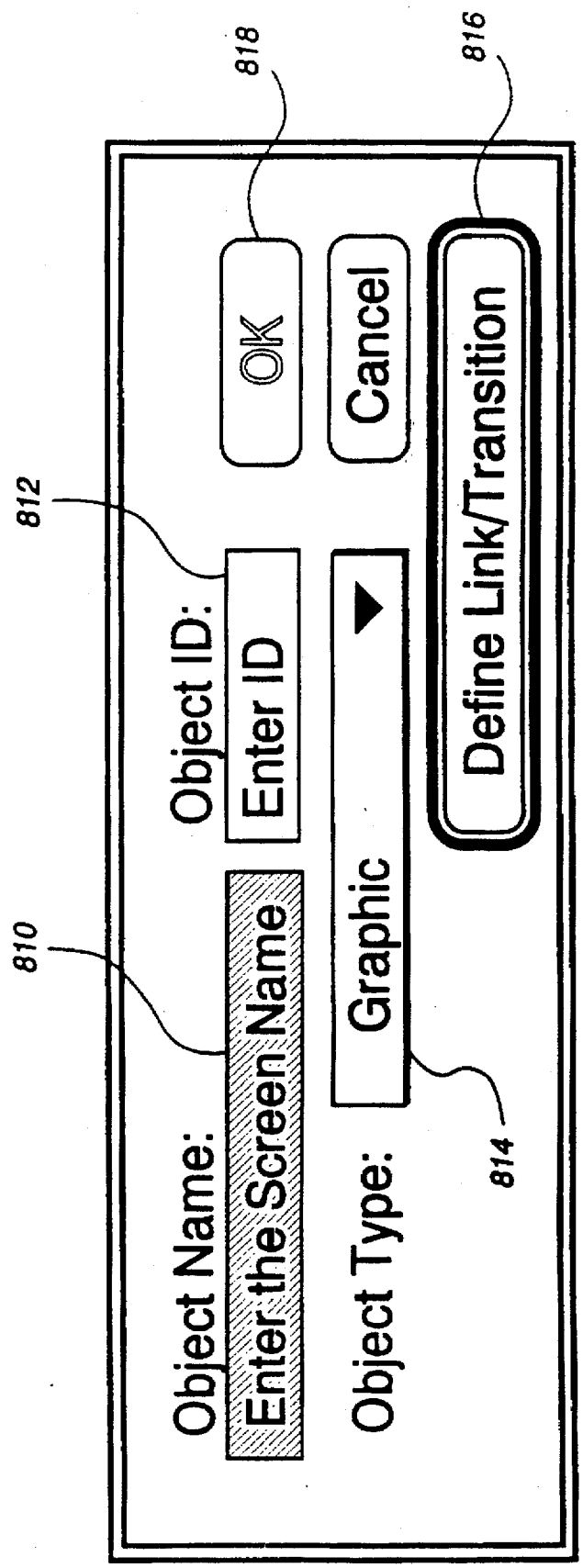
FIG. 8 is an object name dialog box.

Referring now to FIG. 8, the object name dialog box is shown. A new object is created on the screen by selecting the "New Object" item under the "Edit" menu. The New Object dialog box is displayed and requires the user to specify the name 810, ID 812, and type 814 of the object.

A link can also be defined for the new object by calling the Link Association dialogue box available directly from the Object Name dialog box or the "Edit" menu. When the object is first being defined the "Define Link/Transition" button 816 is the default button. After the link association and transition has been defined the "OK" button 818 is the default button.

A new object appears highlighted in the center of the current screen. The object's name, ID or type can be changed via the Object Name Dialog box available through the "Object Info" item under the "Edit" menu. The Object Name Dialog box is also available by double clicking on the object in the control tree.

Description Window

Figure 9:
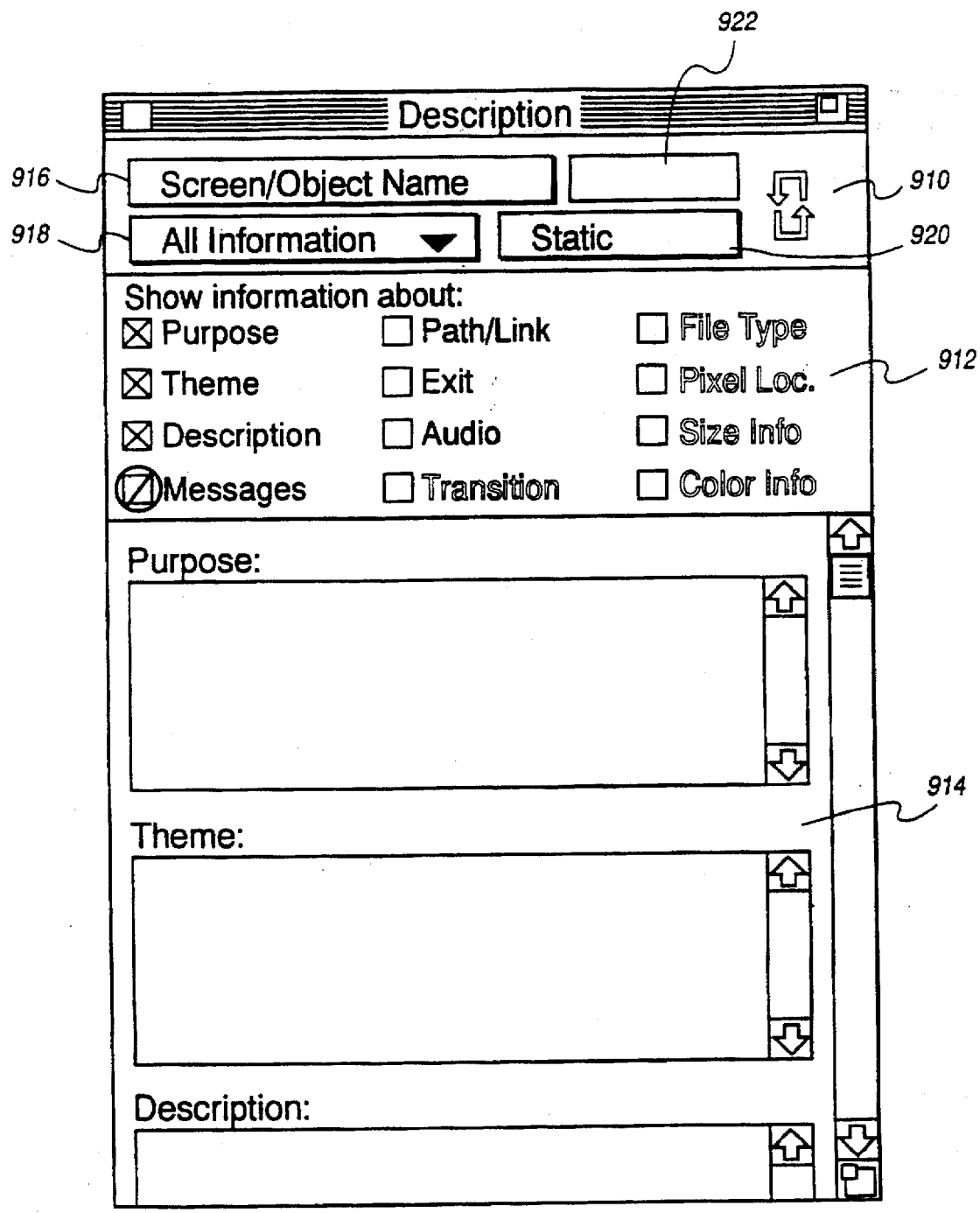
FIG. 9 is a description window.

Referring now to FIG. 9, there is shown the description window of the preferred embodiment. The description window is a resizable (in height only), movable window that provides the user with detailed information about the screen and objects currently being viewed. The description window can be opened via the "Description" item under the "Window" menu. The description window can be closed using the window's close box.

The content of the description window is divided into three horizontal sections; the object identification section 910; the information scope section 912; and the information section 914. A window view pop-up menu appears at the far right of the section, allowing the user to toggle the window to display all three sections or the top and bottom sections only. An icon depicting the view type appears in the menu location showing the current view when the pop-up menu is not being accessed.

The window remembers the settings the user selects even after the window is closed and continues with the selected settings next time the window is opened, until the application is closed. The user can set the default settings for the window using the "Preferences" item under the "edit" menu.

The object identification section 910 of the window allows the user to determine which object's information is displayed in the window and what type of information is presented. This is accomplished through three pop-up menus.

The top left pop-up menu 918 lists the current screen name and all of the objects contained within the current screen. The pop-up menu displays the object last chosen when the menu is not active. The menu defaults to the name of the current screen. When the user selects the name of an object via pop-up menu 916, the information within the window is updated to display the information associated with the selected object.

The ID number of the selected object automatically appears in the field 922 to the right of pop-up menu 916.

Information type pop-up menu 918, immediately below the object name selection menu 916, allows the user to determine what type of information should be displayed.

The choices of information provided by menu 918 include "Demonstration", "Development", "Graphic Design", and "Human Factors." Other choices may be user-defined.

The default for menu 918 is "Graphic Design." Menu 918 displays the name of the type of information being displayed in the window, that is, the users last choice, when the menu is not active.

To the right of the information type menu 918 is pop-up menu 920 allowing the user to set the information presented according to the state of the object, if the object has more than one state. The list of states in menu 920 is "Active", "Highlight", and "Static." The default for menu 920 is "Static." Menu 920 displays the name of the type of information being displayed in the window, that is, the user's last choice, when the menu is not active.

Information scope section 912 consists of a collection of check boxes. The user may select zero or more available boxes, defining what information about the selected object should be displayed. If a box is checked, the information pertaining to the topic will be displayed in the bottom section according to the parameters selected in the top section.

There is a title at the top of information scope section 912 reading, "Show information about". Although information scope options are user-definable, Table 8 shows the currently defined information scope options:

TABLE 8

| OPTION | DESCRIPTION |
| --- | --- |
| Purpose | The reason the object is necessary. Could have several purposes or even be dynamic. |
| Theme | Dependent upon the type of object. Could be an audio mood and tempo, or an artistic style. |
| Description | A description of the characteristics of the object. Could be visual, audio, spatial or whatever the designer is concerned about. |
| Messages | Includes 3 major areas: <br> 1) The information presented to the user if info is requested. <br> 2) The help messages presented to the user when needed or requested. <br> 3) Any possible error messages. |
| Path/Link | The path, or paths, to get to the current screen and any special information necessary about the link-association to or from the screen. |
| Exit | The screen to which an "Exit" goes, as opposed to the link-association of an object. |
| Audio | Detailed information about any audio associated with the object. Could be background music, Folly art, or user feedback effects. Could be general, stating only theme, or specific, including references to specific scores and instruments. |
| Transition | The particular transition used to or from the screen/object. |
| File Type | The type of object resource. Could be |

TABLE 8-continued

| OPTION | DESCRIPTION |
| --- | --- |
| | PICT (graphic), ANIM (animation), MOOV (movie), or AIFF (audio), among others. |
| Pixel Loc. | The local location, in pixel format (xxx yyy), of the upper left corner of the object. |
| Size Info. | The size, in pixel format (www hhh), of the object, if it has one, and the size of the file it refers to, if available. |
| Color Info. | The color depth of the object (e.g. 8, 16, or 32 bit). |

The "Purpose", "Theme", and "Description" check boxes are checked by default. No other check boxes are checked by default, although these setting can be altered by the user via the "preferences" item under the "edit" menu. When the user chooses to display information concerning the entire screen, the "Transition", "File Type", "Pixel Loc.", "Size Info.", and "Color Info." check boxes are shown in gray and are not active since the information presented in those categories is specific to screen objects.

Information section 914 is a scrolling box containing a scrolling text box for each information category checked in information scope section 912. The information is displayed in each scrolling text box.

Only information associated with the current object selection parameters is shown in the text boxes. Each text box can be edited at any time. Preferably, access to the descriptive information should be limited in accordance with security and configuration management.

When the window is resized, the scrolling box fills the available window area. Room for a minimum of 4 lines of text is always shown in each category.

The Comment Input Window

Figure 10:
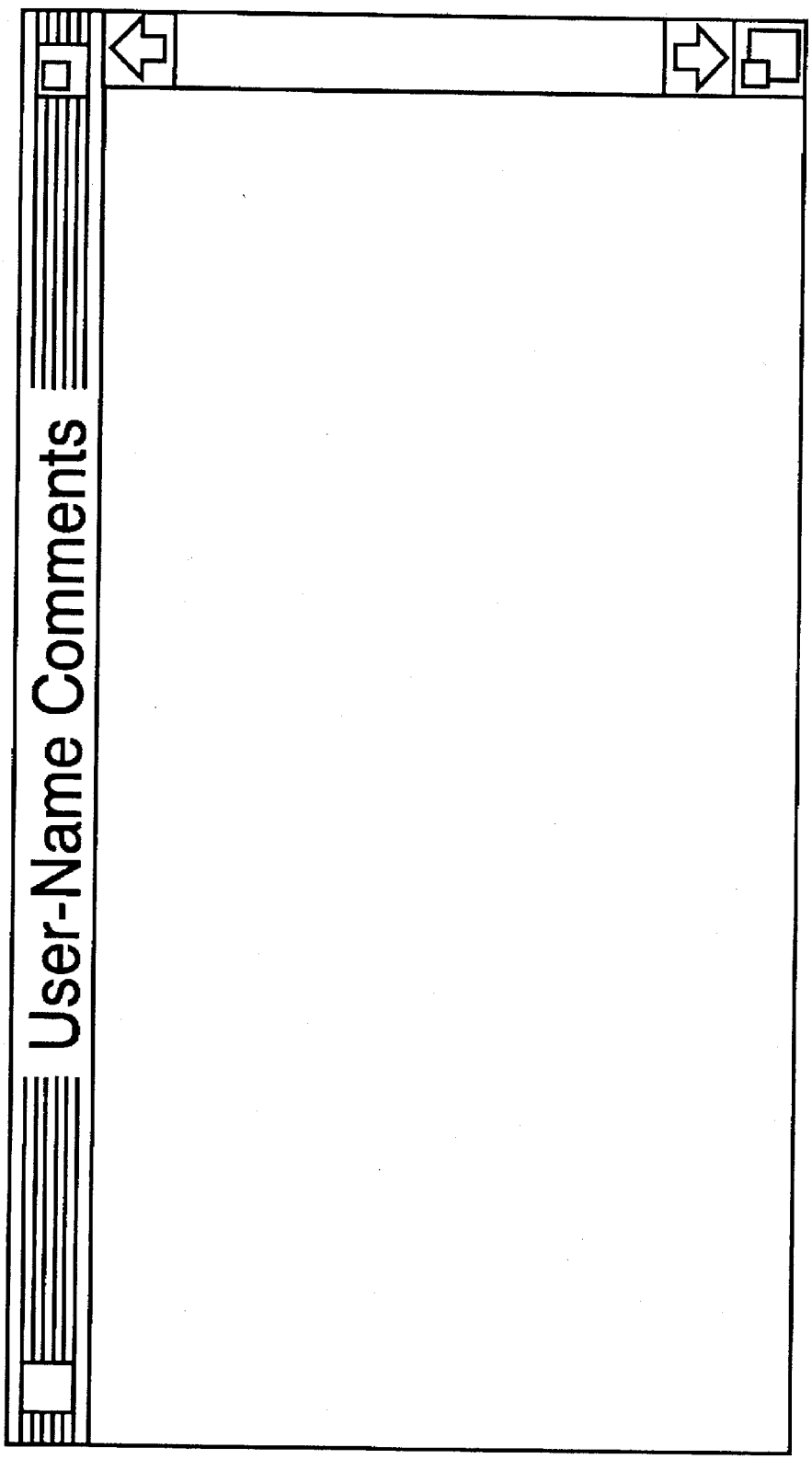
FIG. 10 is a comment input window.

Referring now to FIG. 10, there is shown the Comment Input window. The Comment Input window is a resizable movable text input window. The user's name appears in the title bar of the window; e.g. "Ben's Comments." The user has complete control and flexibility over the text characteristics concerning font, size and style. The Comment Input window displays only the comments the current user has concerning the current screen only. The granularity of the comment window is not as fine as the object level.

The Read-Only Comment Window

Figure 11:
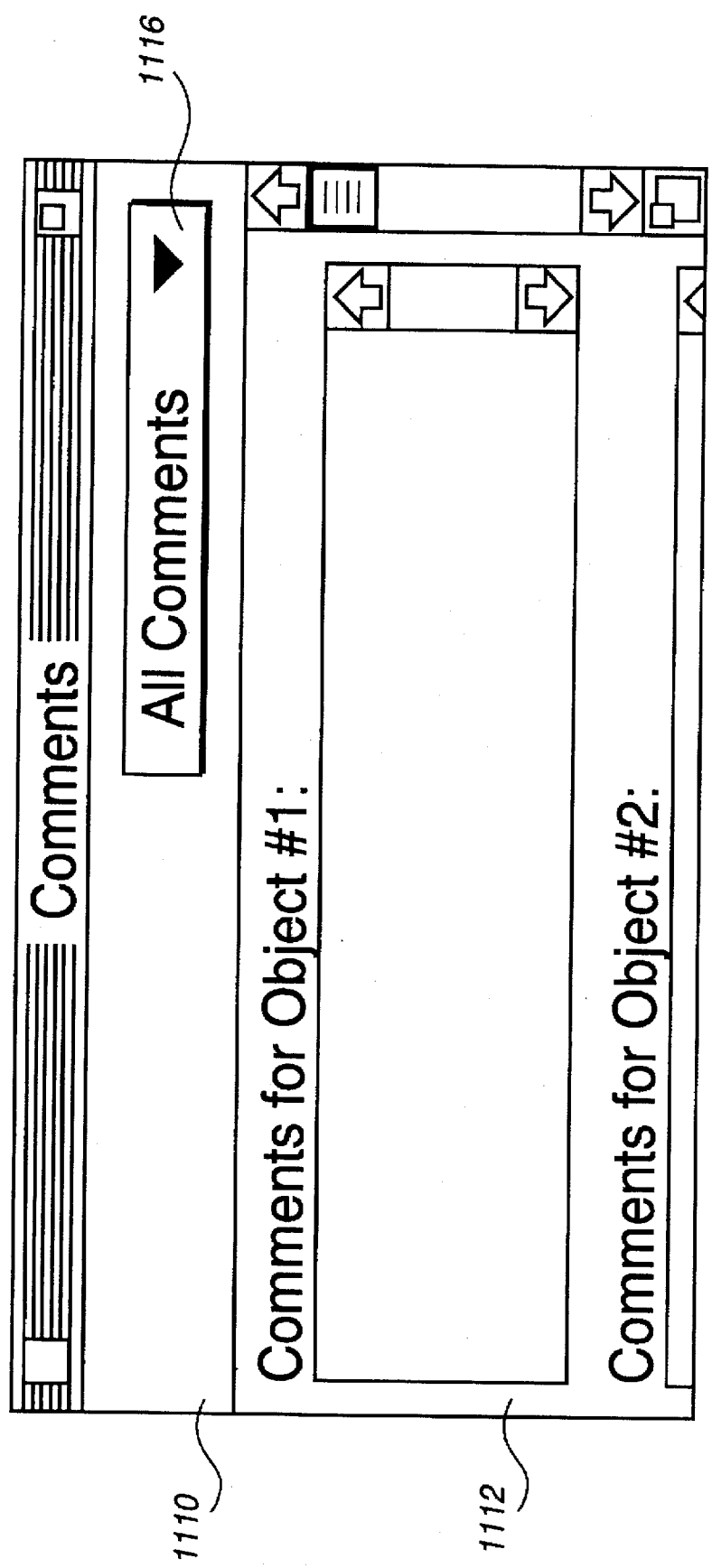
FIG. 11 is a read-only comment window.

Referring now to FIG. 11, the Read-Only Comment window is a resizable, movable window consisting of two sections: parameter section 1110 and comment section 1112. Parameter section 1110 includes pop-up menu 1116. Menu 1116 allows the user to define the scope of the comments. "All Comments" can be shown, or the user can select "Comments by . . . " A selection of "Comments by . . . " causes a modal dialog box to be displayed with a scrolling list of check boxes, allowing the user to request comments by individually named users.

Comment section 1112 is a scrolling box of scrolling text boxes. Each text box contains the comments for the information specified in parameter section 1110, e.g., each box can contain all of the comments on file for a given object. The name of the object or the name of the user appears as a title for each text box. The information in the scrolling text boxes is not editable.

The User Identification Window

Referring now to FIG. 12, there is shown the User Identification dialog box of the preferred embodiment. The User Identification dialog box requires the current user to enter their name, discipline and in some cases an ID number for access privileges. Access privileges are a part of system and application specification security and configuration management.

The dialog box will be presented to the user anytime the user opens a new or existing specification file.

The Tool Palette

Figure 13:
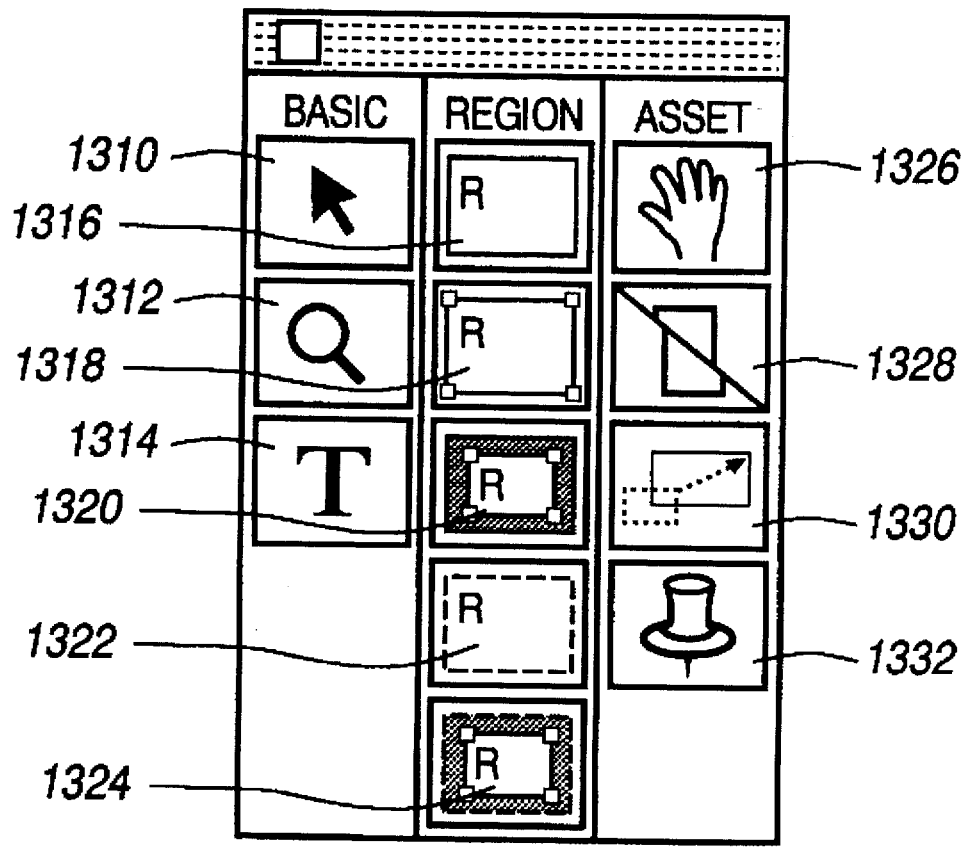
FIG. 13 is a tool palette.

Referring now to FIG. 13, there is shown the Tool Palette of the preferred embodiment. The Tool Palette is a movable floating window of fixed size with a fixed set of icons. One tool is active at a time. The active tool is displayed in reverse as a highlight. The tool icons are divided into three sets: basic tools, object tools and asset modification tools. The cursor becomes an arrow any time the cursor is outside of a Screen window working area, but the currently active tool for the Screen window does not change. Each Screen window remembers its currently active tool and makes that tool the active tool when the Screen window is made the active window.

Basic Tools

Clicking on selection/resizing tool icon 1310 activates the Selection/Resizing tool. The Selection/Resizing selects objects or regions within a window or changes the size or shape of objects within the window via the objects handles. The cursor looks like an arrow when the Arrow tool is active.

Single clicking on an asset or region will make that asset or region active. Double clicking on a region will make that region active and make that regions information window the active window. Double clicking on an asset will make that asset and its region the active region and bring up a dialog box for setting attributes about that asset.

Clicking and dragging the cursor on any re-sizing handle will re-size that object according to the parameters defined for that object. If the object is restricted to a rectangular shape then the resizing will stay rectangular. Combining the shift key with resizing will keep the same aspect ratio for the object. If the object has no shape restriction, then dragging an objects handle will result in the object being reshaped as a quadrilateral.

Clicking on magnification tool icon 1312 activates the magnification tool. The Magnification tool zooms the view in the current window in and out by a factor of ±2. The cursor becomes a magnifying glass when the Magnification tool is active.

Single clicking anywhere in the active window zooms the view by multiplying each pixel in the window by 4, centering the new view in the same window at the location of the Magnification click. When the pixels in the window are multiplied in this way by a factor greater than 1, the Screen Window becomes re-sizable and scrollable.

Double clicking the Magnification tool on a region fills the window with that region. Double clicking on an asset fills the window with that asset.

Holding the "Option" key while clicking the cursor in the window zooms out, shrinking the image displayed by a factor of 2. Double clicking on the Magnification tool resets the window to a magnification factor of 1, the magnification default.

Clicking on text tool 1314 activates the text tool. The text tool is used to add comments to tree components, regions, assets, or general interface notes and specifications. Comments can be shown or hidden via a menu toggle in the "Window" menu. When the text tool is active, a "Type" menu becomes visible in the menu bar allowing the user to set type attributes for the text.

Region Tools

The Region Drawing tools allow a region to be drawn by clicking and dragging the mouse in the area desired. The cursor becomes a cross hair when the Region Drawing tool is active. A dialog box is available via the Window Information submenu, which allows the user to enter necessary information about the region, such as its name, flow of control for interactively, asset budget restrictions, etc. Any number of regions can be drawn. Regions may overlap and may be added or deleted at any time. A new region is added to the top, or front most part of the screen. The order of layering can be reset via the region information window.

Clicking on fixed region icon 1316 activates the fixed region drawing tool. The fixed region drawing tool creates a region that cannot be resized or moved around the screen. Once the region is drawn, it can only be resized through its information window. The region is drawn using a solid line, outlining the regions area. The background of a screen, for example, is a screen size fixed region.

Resizable Region Drawing Tool

Clicking on resizable region icon 1318 activates the resizable region drawing tool. The resizable region drawing tool creates a region that can be resized to any size anywhere on the screen, including full screen. The region is drawn using dashed lines with resize handles in each corner.

The Fixed Range Region Drawing Tool

Clicking on fixed range region icon 1320 activates the fixed range region drawing tool. The fixed range region drawing tool draws a region that consists of a fixed region as an outer limit for the region's size and position, but a resizable region within the outer region. This allows a high level designer to create general rules for layout, restricting the general size and position of a region without having to specify exact details concerning spatial size and layout, unnecessarily restricting the graphic designer.

The region is drawn using a fixed region as an outer limit for the actual regions size and a resizable region as an inner region area showing the actual area used for the defined region. A minimum size for the inner/actual region can be entered into the region's information window. The area between the outer and inner region outlines is displayed using a 30% gray translucence to show the region's possible area.

Fixed Movable Region Drawing Tool

Clicking on fixed movable region icon 1322 activates the fixed movable region drawing tool. The fixed movable region drawing tool creates a region that is fixed in size but can be moved anywhere in the interface. The size of this type region can be reset in the regions information window. The region is drawn using a dashed line showing the area of the region.

Fixed Range Movable Region Drawing Tool

Clicking on fixed range movable icon 1324 activates the fixed range movable region drawing tool. This region drawing tool works in the same manner as the fixed range region drawing tool, except the fixed area of the region can be moved but not resized.

The region is drawn using a fixed movable region as an outer limit to the region's size and a resizable region as an inner region area for the actual area used for the defined region. The area between the two region outlines is displayed using a 30% gray translucence to show the region's possible area.

Asset Tools

Clicking on positioning tool icon 1326 activates the positioning tool. The Positioning tool allows the user to move an image asset around a defined region in a similar fashion to moving a piece of paper on a table. The cursor becomes a hand icon when the Positioning tool is selected. Clicking the cursor on an image and dragging the cursor will cause the image to "slide" in the same direction. The positioning tool can be used on any image asset on the screen. If multiple assets are visible and layered on top of each other, the forward most asset will be the active asset when clicked.

Clicking on cropping tool icon 1328 will activate the cropping tool. The Cropping tool reduces the viewable area of the image. The cursor looks like the cropping tool when the cropping tool is active. Clicking and dragging the cursor defines an area to be cropped. The area is defined by moving dashed lines with re-size handles at each corner. When the cursor is outside the defined area to be cropped or at one of the crop area handles, the cursor becomes an arrow, allowing the area to be cropped to be changed before executing the crop.

When the "Return" or "Enter" key is pressed, or the crop cursor is clicked inside the area defined to be cropped, any image outside of the crop marks is deleted from view. If the "Escape" key is pressed or another tool is selected before the "Return" or "Enter" key is pressed then the crop is canceled.

Clicking on scaling tool icon 1330 will activate the scaling tool. The scaling tools allows the user to scale the currently selected media asset into its region area. A dialogue box is presented allowing the user to specify scaling options. The user can scale by an overall percentage, retaining the original aspect ratio of the image, or by user entered percentages for horizontal and vertical scaling. Clicking the "OK" button on the dialog box causes the scaling to be performed.

Clicking on tack tool icon 1332 will activate the tack tool. The tack tool "fixes" an asset to a region. This is done to each asset when the user is satisfied in the size and position modifications and wants to lock the asset to the region. This keeps the asset from being unintentionally modified.

While the best mode for carrying out the invention has been described in detail, those familiar with the art to which this invention relates will recognize various alternative designs and embodiments for practicing the invention as defined by the following claims.

What is claimed is:

1. In a computer system, a method for preparing an interactive user-interface specification to facilitate development of a multimedia application by members of a development team, the method comprising:

storing a data structure representing a control tree, the control tree including screens, screen objects associated with the screens, and link associations of an interactive user-interface specification associated with a multimedia application; displaying a graphic representation of at least one of the screens, screen objects, and link associations of the control tree based on the data structure;

receiving a user-generated modification signal from a member of the development team representing a user modification to the control tree;

modifying the data structure representing the control tree based on the modification signal thereby modifying the interactive user-interface specification and the associated multimedia application;

storing the modified data structure; and displaying a graphic representation of at least one of the screens, screen objects, and link associations of the modified control tree based on the modified data structure to allow another member of the development team to modify the interactive user-interface specification and the associated multimedia application via another user-generated modification signal.

2. The method of claim 1 wherein the graphic representation is selected from the group consisting of screen icons, link-association icons, and screen object icons.

3. The method of claim 2 wherein the graphic representation is a screen object icon, the screen object icon representing at least one media asset.

4. The method of claim 3 further including:

receiving a user-generated command signal to generate the at least one media asset represented by the screen object icon; and generating the at least one media asset represented by the screen object icon.

5. The method of claim 1 further including:

receiving a user-generated command signal to display information related to the screens and screen objects of the control tree;

selecting information related to the screens and screen objects of the control tree; and displaying the selected information.

6. The method of claim 5 wherein selecting information includes examining a user ID associated with the user.

7. The method of claim 6 wherein selecting information further includes examining a user selection of desired information.

8. The method of claim 1 wherein modifying includes adding a screen to the control tree.

9. The method of claim 1 wherein modifying includes adding a screen object to a screen of the control tree.

10. The method of claim 1 wherein receiving a modification signal includes:

displaying a screen window including a plurality of screen objects associated with a screen;

receiving a selection signal representing a user selection of one of the plurality of screen objects associated with the screen; and receiving a modification signal representing a user modification of the selected screen object.

11. The method of claim 1 wherein modifying includes adding a link association to the control tree.

12. The method of claim 1 wherein receiving a modification signal includes:

displaying a link-association dialog box including information defining a link association between a pair of screens; and receiving a modification signal representing a user modification of the information of the link-association dialog box.

13. The method of claim 1 wherein modifying includes:

displaying a tool palette;

receiving a signal representing a user selection of a tool from the tool palette;

receiving a signal representing a user selection of a screen object associated with a screen of the control tree;

receiving a set of signals representing at least one user command to modify the selected screen object in accordance with the functionality of the selected tool.

14. The method of claim 1 wherein modifying includes adding a user comment associated with the control tree.

15. The method of claim 1 further including:

receiving a user-generated command signal representing a user command to register a comment related to at least one of the screens, the screen objects, and the link associations of the control tree;

receiving a set of user-generated comment signals representing a user comment; and storing data representing the user comment.

16. The method of claim 15 wherein the user comment is a modification request.

17. A system for preparing an interactive user-interface specification to facilitate development of a multimedia application by members of a development team, the system comprising:

a memory for storing a data structure representing a control tree, the control tree including screens, screen objects associated with the screens, and link associations of an interactive user-interface specification associated with a multimedia application;

a display device operable with the memory for displaying a graphic representation of at least one of the screens, screen objects, and link associations of the control tree based on the data structure;

an input device for receiving a user-generated modification signal from a member of the development team representing a user modification to the control tree; and a processor operable with the input device and the memory to modify the data structure representing the control tree based on the modification signal thereby modifying the interactive user-interface specification and the associated multimedia application;

wherein the memory stores the modified data structure and the display device display a graphic representation of at least one of the screens, screen objects, and link associations of the modified control tree based on the modified data structure to allow another member of the development team to modify the interactive user-interface specification and the associated multimedia application via another user-generated modification signal.

18. The system of claim 17 wherein:

the graphic representation is a screen object icon which represents at least one media asset, wherein the input device is operable to receive a user-generated command signal to generate the at least one media asset represented by the screen object icon and the processor is operable to generate said at least one media asset in response to the user-generated signal.

19. The system of claim 17 wherein:

the input device is operable to receive a user-generated command signal to display information related to the screens and screen objects of the control, the processor is operable to select information related to the screens and screen objects of the control tree based on the user-generated command signal, and the display device is operable for displaying the selected information.

20. The system of claim 19 wherein:

the processor is further operable for examining a user ID associated with the user.

21. The system of claim 20 wherein:

the processor is further operable for examining a user selection of desired information.

22. The system of claim 17 wherein:

the processor modifies the data structure representing the control tree by adding a screen to the control tree.

23. The system of claim 17 wherein:

the processor modifies the data structure representing the control tree by adding a screen object to a screen of the control tree.

24. The system of claim 17 wherein:

the display device is operable for displaying a screen window including a plurality of screen objects associated with a screen, and the input device is operable for receiving a selection signal representing a user selection of one of the plurality of screen objects associated with the screen and for receiving a modification signal representing a user modification of the selected screen object.

25. The system of claim 17 wherein:

the processor modifies the data structure representing the control tree by adding a link association to the control tree.

26. The system of claim 17 wherein:

the display device is operable for displaying a link-association dialog box including information defining a link association between a pair of screens, and the input device is operable for receiving a modification signal representing a user modification of the information of the link-association dialog box.

27. The system of claim 17 wherein:

the display device is operable for displaying a tool palette, and the input device is operable for receiving a signal representing a user selection of a tool from the tool palette, a signal representing a user selection of a screen object associated with a screen of the control tree, and a set of signals representing at least one user command to modify the selected screen object in accordance with the functionality of the selected tool.

28. The system of claim 17 wherein:

the processor modifies the data structure representing the control tree by adding a user comment associated with the control tree.

29. The system of claim 17 wherein:

the input device is operable to receive a user-generated command signal representing a user command to register a comment related to the at least one of the screens, the screen objects, and the link associations of the control tree and to receive a set of user-generated comment signals representing a user comment, wherein the processor is operable to store the data representing the user comment.

* * * * *